United States Patent

[11] 3,584,805

[72] Inventor Lester H. Lee
Los Altos, Calif.
[21] Appl. No. 818,172
[22] Filed Mar. 24, 1969
[45] Patented June 15, 1971
[73] Assignee Recortec, Inc.
Mountain View, Calif.

[54] TAPE TRANSPORT APPARATUS
22 Claims, 3 Drawing Figs.

[52] U.S. Cl. 242/184, 242/71.52, 318/7
[51] Int. Cl. G11b 15/06, G11b 15/58, G11b 23/12
[50] Field of Search 242/182—191, 75.51, 75.52; 318/7, 326; 250/219

[56] References Cited
UNITED STATES PATENTS

| | | | |
|---|---|---|---|
| 2,295,327 | 9/1942 | Bendz | 242/75.52X |
| 3,047,198 | 7/1962 | Long | 226/42 |
| 3,203,636 | 8/1965 | Owen | 242/75.51X |
| 3,311,313 | 3/1967 | Rayfield | 242/184 |
| 3,329,364 | 7/1967 | Brettell | 242/184 |
| 3,454,960 | 7/1969 | Lohrenz | 242/184 |

*Primary Examiner*—Leonard D. Christian
*Attorney*—Limbach, Limbach & Sutton

ABSTRACT: A reel-to-reel tape drive is provided, each reel drive motor being included in separate servo loop systems. A tape tensioning means is employed which produces a tape loop and the length of the tape loop is measured to control at least one of the reel motor servo loops, the reel motors rotating under control of the servo to maintain the length of the loop, and thus the tension of the tape, constant. A tape speed measuring device is used to control the servo loop of one of the motors to precisely determine and maintain the speed of the tape.

Figure 1:
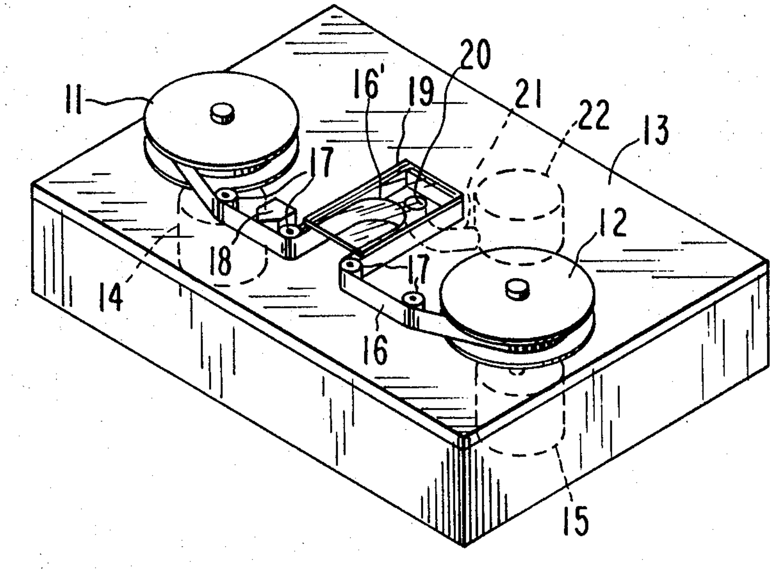

INVENTOR.
LESTER H. LEE
BY Limbach & Limbach
ATTORNEYS

INVENTOR.
LESTER H. LEE
BY Limbach and Limbach
ATTORNEYS

TAPE TRANSPORT APPARATUS

This invention relates in general to a tape transport apparatus and more specifically to a high performance reel-to-reel tape drive system.

The simplest method of tape transporting in magnetic tape recording and other tape systems is a reel-to-reel drive wherein the reels are driven by separate drive motors. Such reel-to-reel drive does not provide a uniform tension in the tape and has a poor speed control but it is the least expensive system. When it is desired to have a greater degree of control over the tension and the speed of the tape, the tape is driven between the two reels by a separate capstan motor, the reel motors then serving to rotate the reels for taking up and feeding off the tape. In order to have precise control of the speed of the tape, the drive capstan is usually of small diameter driven by a high speed motor. The linear speed of the tape is limited by the small diameter of the capstan. This capstan drive system has higher performance (good tape tension and speed control) but is more expensive because of the additional apparatus, including the capstan drive motor. The addition of a capstan also makes it difficult to achieve precise tape guiding and is more difficult to thread tape.

The object of the present invention is to provide a capstanless drive, i.e., reel-to-reel drive, which will achieve the high performance level of a capstan drive system and yet have the inexpensive nature of such reel-to-reel drives. The capstanless system of the present invention has fewer mechanical parts to enhance reliability and reduce maintenance and to reduce cost. This novel reel-to-reel drive has better tape guiding characteristics than a capstan drive because of the fewer rotating parts and less tendency to drive the tape offline. It is easier to align the tape and to maintain such alignment during the rapid tape passage.

In addition, the tape speeds attainable with this novel reel-to-reel drive are much greater than with the capstan drive since it does not have the r.p.m. limitations inherent in capstans. For example, a typical high performance capstan drive system moves the tape at 120 inches per second. Systems made in accordance with the present invention drive tape at speeds up to as high as 1200 i.p.s. with good tape tension and speed control. With this novel reel-to-reel drive, one can expect at least speeds of twice that obtainable with good capstan drive systems.

The present invention also provides a tape tension which is constant regardless of the speed and direction of the tape movement. The novel drive system employed also provides flexibility in design characteristics such as tape tension and speed adjustments.

One aspect of the present invention is the provision of two reel drive motors and a means between the reels for exerting a tape tensioning force on one side of the tape which displaces the tape, for example, by forming an open-ended loop in the tape. A means is provided, such as a light and photosensitive detector system, for measuring the length of the loop. A servo loop is provided for at least one of the reel drive motors including the photosensitive detector output, a high gain amplifier stage and the reel drive motor for controlling the direction of rotation of the motor so as to cause the reel to rotate in one direction or the other so as to always maintain the length of the tape loop at a predetermined selected length. In one embodiment of the invention, a second servo loop comprising the photosensitive detector and the second reel drive motor is employed such that the second reel also rotates in one direction or the other to maintain the tape loop at the preselected length. A separate drive signal into one of the reel motors will cause the motor to rotate clockwise or counterclockwise, dependent on the sign of the separate drive signal, to move the tape in one direction or the other from reel-to-reel, the servo loops operating to maintain the tape loop at its preselected length, and thus constant tension in the tape. Thus the tape is fed off of one reel and onto the other reel under constant tape tension. Although tension is maintained constant, this embodiment does not provide precise tape speed control.

In another embodiment of the invention, the servo loop to the second drive motor omits the tape loop detector but includes a tachometer generator driven by the tape. A control signal input into this servosystem, depending on the sign of the signal, will cause the motor to move in one direction or the other to move the tape. In moving, the tape drives the tach generator to produce an electrical signal in the servo loop to offset the control signal, this offset signal being proportional to the tape speed. The tape speed is thus precisely controlled by this servo loop, the exact speed of the tape being determined by the strength of the control signal and the direction of tape movement being determined by the sign of the control signal. Meanwhile, the other motor is controlled by the tape loop measuring servo to maintain tape tension.

Figure 2:
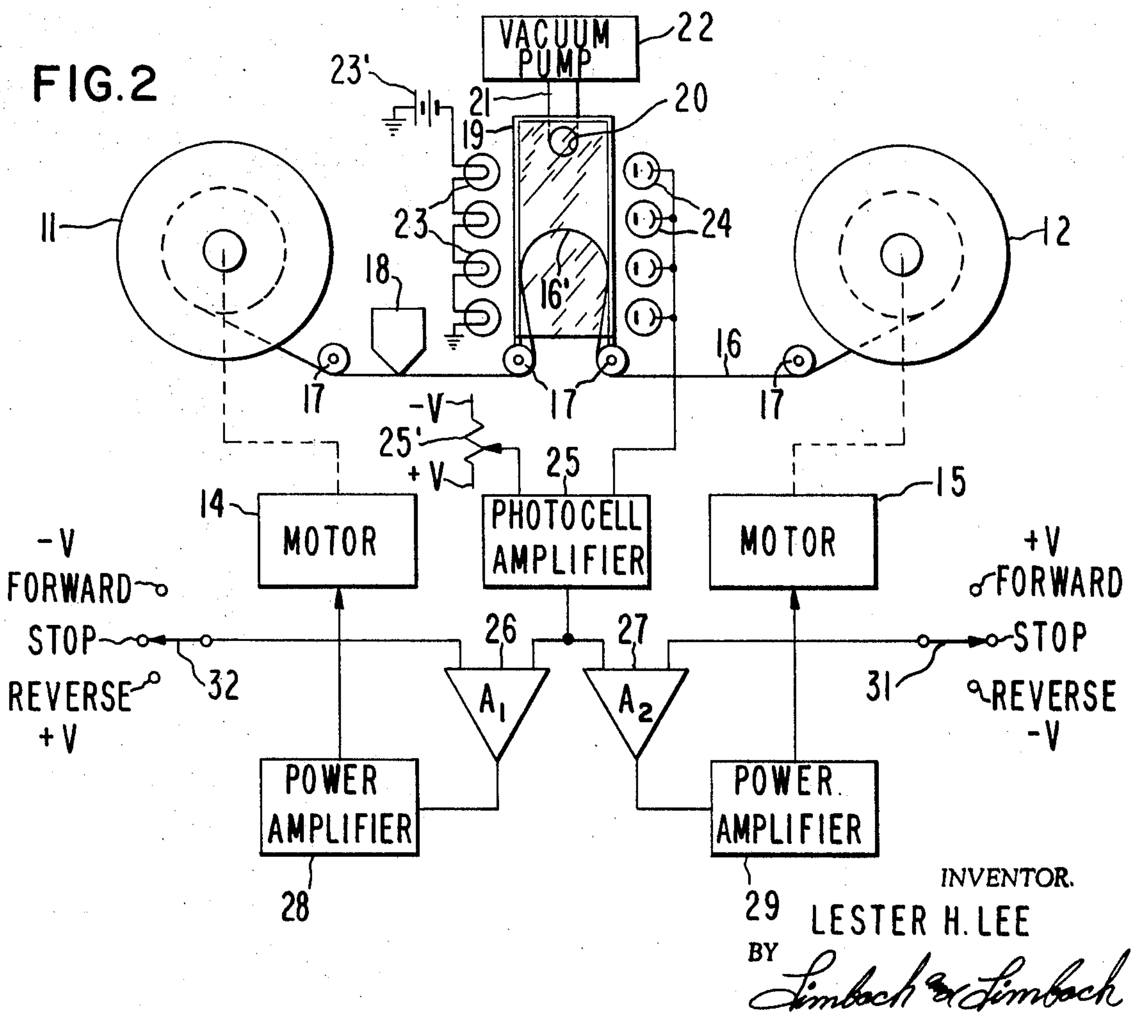
Figure 3:
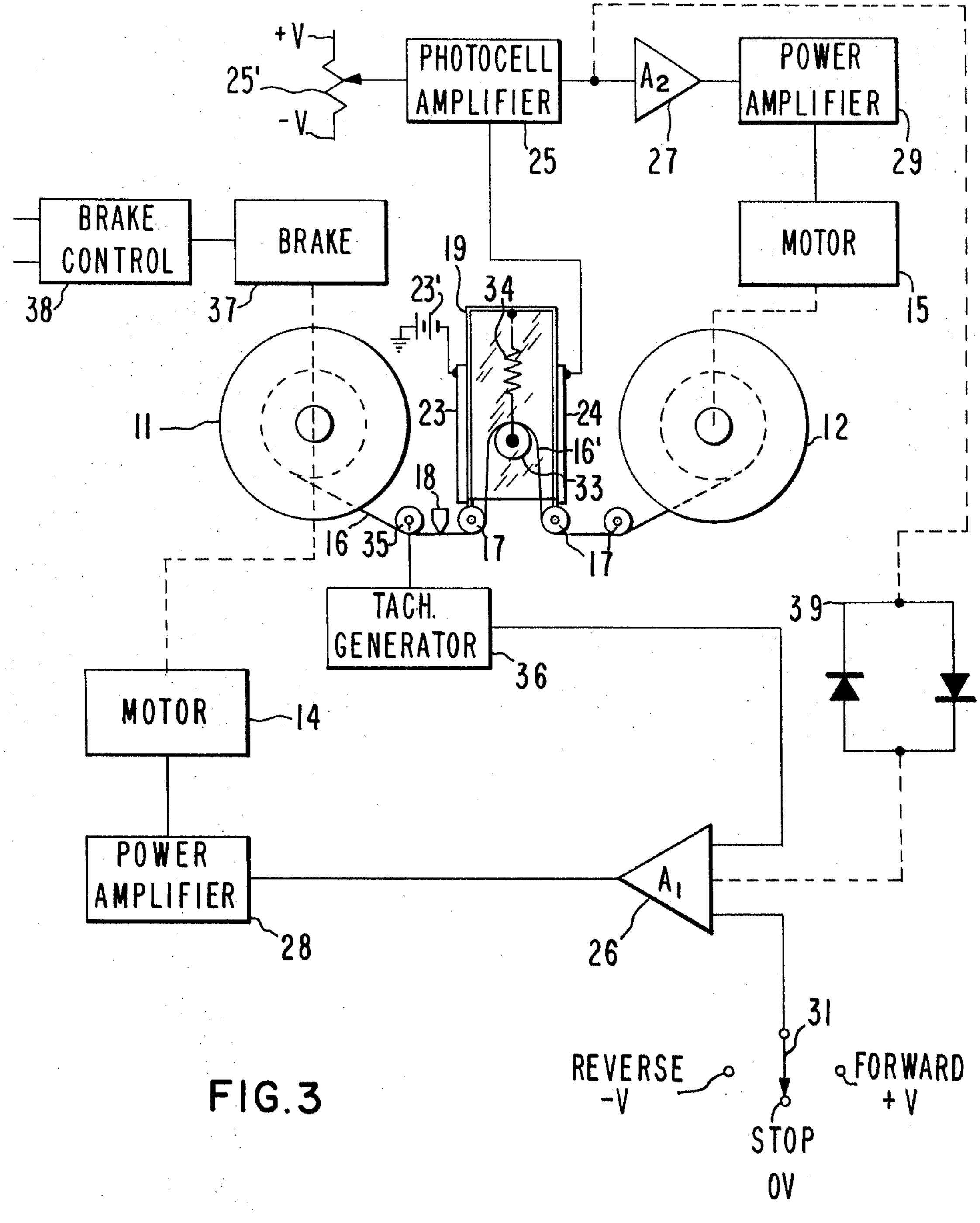

These and other advantages and features of the present invention will become more apparent from a perusal of the following specification taken in connection with the accompanying drawings wherein:

FIG. 1 is a perspective view of the mechanical arrangement of a typical tape transport of the present invention, FIG. 2 is a schematic diagram of the tape drive and control system showing one embodiment of the present invention, and FIG. 3 is a schematic diagram of the tape drive and control system of another embodiment of the present invention.

Referring now to the FIGS. 1 and 2 of the drawings, two tape reels 11 and 12 are rotatably mounted on the baseplate 13 which supports on its under surface a pair of drive motors 14 and 15 for the reels 11 and 12, respectively. The drive motors which are used to illustrate this invention are commercially available, high torque, reversible DC permanent magnet motors operating on 24 volts DC for example. Rather than using reversible motors, single direction motors with suitable clutch drives for driving the associated reel in either direction could be employed. Also, alternating current induction motors or other forms could be used, although the DC type used to illustrate this invention has been found to be very reliable, precise and inexpensive.

The recording tape 16 threaded on and extending between the two reels passes over guide posts 17 and in contact with a recording head 18. The recording head 18 is shown for illustration purposes only since the present invention is particularly concerned with the field of tape transport or drive broadly and not with the specific field of recording, erasing, tape cleaning or the like. Systems for recording, erasing, etc. will not be shown or described since they are well known and form no part of the present invention. The applications and uses for this tape drive invention are extensive and will be immediately obvious to those skilled in the various arts employing tape transport apparatus including audio and video recording and playback, and computer storage and retrieval.

An enclosed, elongated chamber 19 is mounted on the plate 13 having one open end facing the two central guide posts 17, the tape 16 passing across this open end. An opening 20 located within the chamber 18 and in the baseplate 13 is connected via duct 21 to an electrically driven vacuum pump 22 which operates continuously and serves to reduce the pressure within chamber 19. Air pressure on the outside of the chamber exerts a force on the side of the tape 16 and urges the tape into the chamber through the open end, forming the tape into an open-ended loop 16'.

A light source comprising a plurality of lamps 23, connected to a lamp supply 23; are aligned along one side of the chamber 19 this sidewall being made of a transparent material, and direct their light across the chamber, through the opposite transparent sidewall of the chamber and onto a photosensitive apparatus comprising a plurality of serially connected photoelectric cells 24. The amount of light that impinges on the photocells 24 from the lamps 23 is proportional to the distance that the opaque tape 16 is displaced into the chamber 19 by the air pressure, an increase in the length of the loop 16' reducing the impinging light and a decrease in the loop length increasing the light impingement. The amplitude of the electrical output of the serially connected photocells is thus related to the length of the loop 16', a shorter loop giving a greater signal output then a longer loop.

It should be understood that other forms of loop length sensing means could be employed although light sensitive apparatus has proven very satisfactory. The lamp source may be incandescent, fluorescent or neon, and it may be a single filament device or multiple lamps. The photosensitive apparatus may be silicon or selenium photocells or cadmium-sulfide detectors, either in strip form or multiple units.

The output of the photosensitive cells is coupled to a DC amplifier 25 which is also coupled to a control or balancing source of power 25'. The output of the amplifier is coupled in parallel to two operational amplifiers 26 and 27, i.e. high gain, low drift DC amplifiers, which in turn are coupled through power amplifiers 28 and 29 to the drive motors 14 and 15, respectively.

The amplifier gain of the operational amplifiers 26 and 27 is 10 to 1000 depending on the cell output. In using solar cells for the photosensitive device, a typical cell current output will range from 20 mv. to 1 v. and a typical output from the operational amplifier will range from 2 to 10 volts. In using photoresistive material as the photosensitive device, the same range of operational amplifier output will be obtained.

The power amplifiers used are high gain (current) DC amplifiers with outputs swinging between +24 volts and −24 volts and maximum current to 20 amps. Such amplifiers were chosen to be compatible with the 24 volt DC motors selected. Other motors and amplifier systems could be substituted. For example, for driving an AC motor, a DC to AC converter could be placed at the input of the power amplifiers and the power amplifier designed to provide AC power out.

One of the operational amplifiers, for example amplifier 27, is also coupled to a command switch 31 which is used to couple an appropriate signal voltage into the amplifier 27 to control the movement of the tape reels.

In operation, assume that the switch 31 is set on the stop position with no control signal input to the amplifier 27. The balance pot 25' is set so that, with the loop 16' positioned midway into the chamber 19, a particular DC output is received from photocells 24 which will produce a slight negative DC output from the photocell amplifier and, as a result, a slight negative driving current to the two reel motors. The drive motor 15 has been connected so that a positive DC input will cause it to rotate in a clockwise direction while a negative DC input will produce counterclockwise rotation. The drive motor 14 is connected so that a positive DC input will cause it to rotate in a a counterclockwise direction while a negative DC input will produce clockwise rotation. Thus the slight negative input produces motor torque just sufficient to balance the air pressure.

The air pressure on the tape 16 will act to lengthen the loop 16'. A movement of the loop 16' into the chamber 19 will reduce the light impinging on the photocells 24 and thus reduce the electrical output from the cells. The output from the photocell amplifier 25 will go move negative and produce increased negative DC inputs to the two motors 14 and 15. The motors will therefore be driven so as to cause the reel 11 to move clockwise and the reel 12 to move counterclockwise to take up the tape. Since both motors are driven to take up the tape, the tape loop 16' will shorten and tend to decrease its length beyond the midpoint in the chamber 19. This will result in an increase in the photocell output and drive the output from photocell amplifier 25 from negative to positive. This positive output will be amplified and positive current applied to both motors 14 and 15, causing reel 11 to move counterclockwise and reel 12 to move clockwise to feed out tape and return the tape loop to its balanced position. This balanced or steady-state condition will prevail until a tape drive signal is given.

When it is desired that the tape be moved in the forward direction, which is selected to be from reel 12 and onto reel 11, the control switch 31 is moved to the forward position where it encounters a positive voltage. The positive input signal to amplifiers 27 and 29 drives the motor 15 and reel 12 in a clockwise direction, feeding tape off of the reel 12 and increasing the length of the tape loop 16'. This increase in tape loop length reduces the light striking cells 24 and the output from the cells 24 decreases. The output from the amplifier 25 goes negative to offset the position input from the switch 31. The negative input to amplifiers 26 and 28 drives the motor 14 and reel 11 in a clockwise direction to take up tape and reduce the length of the loop 16'. Reduction of the loop length past the midway or balance position causes an increase in the output from the cells 24, to cause the input voltage to motor 14 to go less negative and the input to motor 15 to go more positive with a resultant slowdown of reel 11 and speed up of reel 12 to return the loop 16' to its midpoint. Both reels 11 and 12 will continue to rotate clockwise to move tape from reel 12 to reel 11. The tape will therefore move from reel 12 to reel 11 with the loop 16' maintained at the central, balanced position in the chamber 18, the tape movement continuing until such time as the tape supply is exhausted or the switch 31 moved from the forward position.

To stop the tape, the switch 31 is moved to the stop position and the control voltage therefore removed from the input to amplifier 27. The system returns to the steady-state condition described above, with the tape stationary, the loop 16' at its midpoint position, and the two motors with just sufficient torque to balance the force of the air pressure on the tape to maintain tape tension.

In order to drive the tape in the opposite direction, the switch 31 is moved to the reverse position and a negative voltage applied to the input of amplifier 27, this negative input to amplifiers 27 and 28 driving the motor 15 and reel 12 in a counterclockwise direction to take up tape thereon. This serves to shorten the loop 16', increases the light striking cells 24, and results in a positive voltage input to amplifier 27 to balance out the negative input from switch 31 and also transmits a positive input to the motor 14 and reel 11 to drive them in the counterclockwise direction to feed tape off of reel 11. This tends to feed tape into the chamber 19 and return the loop 16' to its normal balanced position. Thus the tape is taken off of reel 11 and onto reel 12 under constant tension maintained by the air pressure.

The above arrangement provides, in effect, two servo loops, one comprising the tape loop 16', cells 24, amplifiers 25, 27 and 29 and motor 15 and reel 12 and the other loop comprising the loop 16', cells 24, amplifiers 25, 26 and 28, and the drive motor 14 and reel 11. The servo loops operate as described above to maintain the loop 16' at its balanced position in the chamber, with the tape capable of remaining in a stopped condition or moving in either direction past the recorder head 18 in accordance with the setting of the control switch 31.

Tape speed is determined by the amount of power that is available from the power amplifiers to drive the reels. One of the reel servos is power limited at a certain tape speed. At the maximum speed, the power supply voltage is just adequate to overcome tensioning torque generated by the vacuum pull, and the back e.m.f. voltage from the reel motor.

Modifications may be made to this arrangement as desired. For example, the control voltages may be applied to the input of amplifier 26 by means of control switch 32 in lieu of controlling amplifier 27 with switch 31. The particular signs of the voltage signals and the particular directions chosen for forward and reverse are illustrative and other arrangements will be obvious to those skilled in the art.

Referring now to FIG. 3 there is shown another embodiment of the present invention which, in addition to obtaining a constant tension in the tape as with the system of FIG. 2, a very precise tape speed control is obtained. Those elements of this system which function similarly to apparatus in FIG. 2 bear the same reference numerals. For illustrative purposes, a tension wheel 33 and spring 34 are shown in lieu of the vacuum chamber to produce a tension in the tape 16 and form the tape loop 16'. A servo loop similar to that shown in FIG. 2 and including the photosensitive device 24, photocell amplifier 25, amplifiers 27 and 29, and motor 15 and reel 12 is utilized in this system to maintain tape tension. In addition, a tape speed tachometer wheel 35 contacts the tape 16 and develops a DC voltage output from tachometer generator 36 in accordance with the speed and direction of travel of the tape 16. This DC signal is amplified in the operational amplifier 26 and power amplifier 28 and applied to the drive motor 14. The tape reel 11 may also be connected to a brake 37 and brake control circuit 38 if desired.

In operation, the motor 14 is connected so that it moves in the counterclockwise or takeup direction in response to a negative voltage input and moves in a clockwise or feedout direction in response to a positive voltage. In the steady-state or stop condition, the control switch 31 is on the off position and the brake circuit 38 is operated to enable the brake 37 and prevent reel 11 from rotating. In some applications, there may be enough friction in the tape path and motor shaft to prevent the reel from moving without applying a brake force. If the loop 16′ tends to lengthen, the light from the light source 23 striking the photosensitive device 24 is decreased and causes the voltage input to motor 15 to go negative causing motor 15 and reel 12 to move in the counterclockwise direction and takeup tape, thus shortening the length of the loop 16′ and returning it to the balanced position. A shortening of the loop 16′ beyond the balance point produces a positive input signal to the motor 15 to rotate the reel clockwise and feed more tape into the chamber 19, the spring 34 returning the loop to the balance position. Thus this servo loop maintains the tape under constant tension against the tension spring 34.

To move the tape from reel 12 to reel 11, the control switch 31 is moved to the forward position where a positive voltage is applied to amplifier 26 and the signal to the brake 37 is removed to release reel 11. The positive voltage through amplifiers 26 and 28 drives the motor 14 and reel 11 in a clockwise direction to takeup tape thereon. The movement of the tape 16 drives the tachometer wheel 35 in a clockwise direction to generate a negative voltage output from tachometer generator 36. The tape speed increases until the negative voltage from generator just balances the positive voltage applied to amplifier 26 from switch 31. The speed is thereafter controlled by the amplitude of the input voltage from the control switch 31. For example, voltage inputs of from 0.1 volt to 150 volts have produced tape speeds of from 1 to 1500 inches per second in certain transports built in accordance with this invention.

In the meantime, movement of tape 16 onto reel 11 causes the loop 16′ to shorten against the restraining tension of spring 34 and increase the amount of light striking the photosensitive detector 24. The positive voltage output developed drives motor 15 and reel 12 in the clockwise direction to thereby feed tape off of reel 12 which is taken up on reel 11. The servo loop involving the motor 15 and reel 12 operates as described above to maintain the tape loop 16′ centered by adjusting the speed of the motor 15. The tape is thus moved under constant tension control by the right-hand servo loop and under precise speed control by the left-hand servo loop from reel 12 to reel 11. The tape may be stopped by switching the control 31 to stop (no voltage) and applying the brake 37. The tape 16 may be driven from reel 11 to reel 12 by setting the switch 31 on the negative voltage (reverse) position and removing the brake, the reel 11 and motor 14 then being driven in a counterclockwise direction, generating a positive balancing voltage from tachometer generator 36, and causing the right-hand servosystem to operate and drive motor 15 and reel 12 in a counterclockwise takeup direction.

Since the two servo loops in FIG. 3 are independent and the speed control loop is unaware of the condition of the tension control loop, a feature may be added to provide a degree of interaction between the reels to take care of those instances where the tension control servo is not able to maintain the loop 16′ in the balanced position. Provision may be made for transmitting a regulation signal to the speed control loop should the tape loop pass beyond a preselected range. For example, if the loop 16′ became too long, a signal would be passed to the motor 14 which would cause the motor to speed up or slow down, depending on the direction of tape movement, to cause the tape loop to be shortened. Conversely, if the loop 16′ became too short, an opposite polarity signal would be sent to the motor 14 to slow it down or speed it up, as the case might be, to lengthen the loop 16′. This may be accomplished in several ways, including a photocell located at either end of the chamber, one to develop a suitable signal if the tape loop is too short and the other if the tape loop becomes too long. Another system is shown in dotted lines in FIG. 3 and includes a diode or Zener circuit 39 coupling the output of the photocell amplifier 25 to the input of the operational amplifier 26 of the speed control loop. A positive or negative limiting signal will thus be transmitted to motor 14 to prevent runaway.

It will be obvious to those skilled in the art that modifications may be made to the above-described systems without departing from the scope of the invention. Braking apparatus such as that shown in FIG. 3 can be employed with the reel motors 14 and 15 to provide static braking during power-off conditions or to provide braking in case of power failure to prevent breakage or spillage of tape. In addition, well-known forms of end-of-reel detectors, such as light and photocell detector systems can be used to provide automatic stop or revise signals to give a choice of single pass or combined forward and reverse twopass. Straight forward types of control logic circuits utilizing either relay or semiconductor circuits may be used to achieve desired speed selection and tension settings. As an alternative form of loop sensing and controlling mechanism to the lamp and photosensitive detector shown in FIG. 3, a potentiometer or a linear voltage differential transformer can be connected to the amplifier 25 and controlled by an element responsive to movement of the wheel 33.

What I claim is:

1. A tape transport apparatus comprising a tape feed reel coupled to a first drive motor and a tape takeup reel coupled to a second drive motor, means for supplying electrical energy to said drive motors for driving the reels and moving the tape therebetween, means for exerting a force against one surface of the tape between the two reels and against the force of the driving motors to create a tension in the tape and to laterally displace the tape a certain distance in the direction of the force, means responsive to a change in the lateral distance of the tape displacement for creating an electrical signal indicative of the direction of the change, and means responsive to said electrical signal for driving both of said drive motors in a direction necessary to feed off, and take up said tape so as to maintain the distance of tape displacement constant.

2. A tape transport as claimed in claim 1 wherein said means for supplying electrical energy to said drive motors includes means for introducing a drive signal into one of said drive motors to cause the associated reel to move said tape in response thereto, said means responsive to the direction of lateral movement of said tape displacement acting to drive said motors to maintain the displacement distance constant and thus resulting in the movement of the tape from said feed reel to said takeup reel under constant tension.

3. A tape transport as claimed in claim 2 wherein said means responsive to the change in distance of displacement of the tape comprises a photoelectric device producing an electrical signal indicative of the direction of said change, an amplifier coupled to said first drive motor and an amplifier coupled to said second drive motor, said amplifiers receiving said electrical signal from said photoelectric device for supplying driving power to said drive motors.

4. A tape transport as claimed in claim 3 wherein said means for introducing said other drive signal is coupled to one of said amplifiers.

5. A tape transport apparatus as claimed in claim 2 wherein the force exerted against said tape forms an open-ended loop in the tape, and said means for controlling said one drive motor comprises a photoemitter and photosensitive means for producing an electrical control signal dependent on the length of said loop.

6. A tape transport apparatus as claimed in claim 5 wherein said means for exerting the force against said tape comprises an open-ended chamber and means for creating a vacuum therein, air pressure exerted on the tape at the open end of the chamber moving the tape into the chamber in the form of a loop, said photoemitter means being located on one side of the loop and said photosensitive means being located on the other side of the loop.

7. A tape transport apparatus comprising two tape reels for taking up and feeding off tape, each being coupled to associated driving motors, means for supplying electrical energy to said drive motors for driving the reels and moving the tape therebetween, means for exerting a force against one surface of the tape extending between the two reels and against the force of the driving motors to create a tension in the tape and to laterally displace the tape a certain distance in the direction of the force, means responsive to change in the lateral distance of tape displacement for creating an electrical signal dependent upon the distance of tape displacement, said electrical signal simultaneously controlling said drive motors to maintain the distance of tape displacement constant, said electrical signal is of one sign to drive said motors in one direction when the change of the lateral distance is in one direction and said electrical signal is of opposite sign to drive said motors in the opposite direction when the change of the lateral distance is in the opposite direction.

8. A tape transport apparatus comprising two tape reels for taking up and feeding off tape, each being coupled to associated driving motors, means for supplying electrical energy to said drive motors for driving the reels and moving the tape therebetween, means for exerting a force against one surface of the tape extending between the two reels and against the force of the driving motors to create a tension in the tape and to laterally displace the tape a certain distance in the direction of the force, means for creating an electrical signal indicative of change in the lateral displacement of said tape, and amplifier means responsive to said electrical signal to transmit drive signals to said drive motors to drive both of said motors in directions to take up or feed off said tape to maintain the distance of the tape displacement constant.

9. A tape transport apparatus as claimed in claim 8 wherein the force exerted against said tape forms an open-ended loop in the tape, and said means for creating said electrical signal comprises a photoemitter and photosensitive means for producing an electrical control signal dependent on the length of said loop.

10. Tape transport apparatus according to claim 8 further comprising:

means responsive to the tape velocity between said reels for generating a velocity signal and means for applying said velocity signal to one of said drive motors.

11. Tape transport apparatus comprising:

means for feeding off a supply of tape, means for taking up said supply of tape from said feedoff means, means for exerting a force against the tape between said feedoff and takeup means to displace the tape in the direction of the force, and means responsive to change in the tape displacement to generate a signal for simultaneously controlling said feedoff and takeup means to maintain the distance of tape displacement substantially constant.

12. Tape transport apparatus according to claim 11 further comprising means responsive to the tape velocity between said feedoff and tapeup handling means for generating a velocity signal and means for applying said velocity signal to one of said tape handling means for controlling the velocity of said tape.

13. Apparatus according to claim 11 wherein said means for feeding off a supply of tape includes a first drive motor and said means for taking up said supply of tape includes a second drive motor, said first and second drive motors simultaneously responsive to said signal.

14. Apparatus according to claim 13 wherein said means for exerting a force comprises a single open-ended chamber and means for creating a vacuum therein; air pressure exerted on the tape at the open end of the chamber moving the tape into the chamber in the form of a loop.

15. Tape handling apparatus according to claim 13 wherein said means for exerting a force comprises a tension wheel and a spring biased to exert a force on the tape when said tension wheel engages the tape.

16. Tape transport apparatus comprising:

tape handling means responsive to a first signal for feeding off a supply of tape, tape handling means responsive to a second signal for taking up said supply of tape, means for exerting a force against the tape between said feedoff and takeup tape handling means to displace the tape in the direction of the force, means responsive to change in said tape displacement for generating a displacement signal, means responsive to the tape velocity between said feedoff and takeup tape handling means for generating a velocity signal, means for applying said displacement signal to only one of said tape handling means, and means for applying said velocity signal to only said other tape handling means.

17. Tape handling apparatus according to claim 16 wherein said velocity signal is applied to said feedoff tape handling means and said displacement signal is applied to said takeup tape handling means.

18. Tape handling apparatus according to claim 17 wherein said feedoff tape handling means includes a first drive motor and said takeup tape handling means includes a second drive motor.

19. Tape handling apparatus according to claim 18 wherein said means for generating a velocity signal comprises a tachometer means driven by the tape for generating a signal dependent on the tape speed.

20. Tape handling apparatus according to claim 19 wherein said means for exerting a force comprises a single open-ended chamber and means for creating a vacuum therein, air pressure exerted on the tape at the open end of the chamber moving the tape into the chamber in the form of a loop.

21. Tape handling apparatus according to claim 19 wherein said means for exerting a force comprises a tension wheel and a spring biased to exert a force on the tape when said tension wheel engages the tape.

22. A tape transport apparatus comprising two tape reels for taking up and feeding off tape, each being coupled to associated driving motors, means for supplying electrical energy to said drive motors for driving the reels and moving the tape therebetween, means for exerting a force against one surface of the tape extending between the two reels and against the force of the driving motors to create a tension in the tape and to laterally displace the tape a certain distance in the direction of the force, means responsive to change in the lateral distance of the tape displacement for driving one of said drive motors to maintain the distance of tape displacement constant, and means responsive to the speed of travel of said tape between the reels for driving the other drive motor, said one drive motor being driven only in response to tape displacement and said other drive motor being driven only in response to the speed of tape travel.